United States Patent Office 3,544,587
Patented Dec. 1, 1970

3,544,587
SUBSTITUTED TOLUIDIDES AND COMPOSITIONS
CONTAINING THEM
Charles Leslie Meredith Brown, Ewell, Epsom, Surrey,
England, assignor, by mesne assignments, to Wigglesworth Limited, Westhoughton, Lancashire, England, a
British company
No Drawing. Filed June 20, 1966, Ser. No. 558,626
Claims priority, application Great Britain, June 23, 1965,
26,666/65
Int. Cl. C07d 27/04
U.S. Cl. 260—326.3                                     3 Claims

ABSTRACT OF THE DISCLOSURE

This invention relates to a class of aminopropionyl-o-toluidides and their acid addition salts which are useful as local anaesthetics. The toluidides have the general formula:

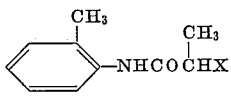

in which X is a member of the class consisting of —NHR and —N=Q, R represents a cycloalkyl ring which may have alkyl substituents and which contains a total of 3 to 5 carbon atoms in the ring, and Q together with the nitrogen atom to which it is linked represents a heterocyclic ring which may have alkyl substituents and which has a total, including any carbon atoms in the alkyl substituents of from 3 to 5 carbon atoms.

---

This invention relates to substituted toluidides and is especially concerned with clinically useful cycloalkyl-amino-acyl aniline compounds having local anaesthetic properties. The invention also relates to pharmaceutical preparations containing these compounds.

Alkylamino-acyl toluidides possess local anaesthetic properties to a greater or lesser extent, but many of these toluidides also have undesirable side effects, such for example as strong local irritation and poor incidence of anaesthesia, whether the methyl group is in the ortho-, meta- or para-position. Their clinical use is therefore prevented. A limited group of these toluidides, namely the α-monoalkyl derivatives of aminopropionyl-o-toluidine in which the alkyl group does not have more than four carbon atoms, do have useful pharmacological properties, however, which are substantially free from side effects in the dosage amounts used.

We have now found in accordance with the invention that certain cycloalkyl derivatives of aminopropionyl-o-toluidine also have useful pharmacological properties substantially without undesirable side effects. These cycloalkyl derivatives which are aminopropionyl-o-toludides can be represented by the general formula:

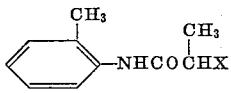

in which X represents —NHR or —N=Q, R represents a cycloalkyl ring which may be branched and which contains 3, 4 or 5 carbon atoms in the ring, and Q together with the nitrogen atom to which it is linked represents a heterocyclic ring which may be branched and which has a total, including any carbon atoms in the branches, of 3, 4 or 5 carbon atoms.

These substituted toluidide compounds can be prepared by reacting the intermediate α-halo-propio-o-toluidide with an amine compound having the general formula $H_2NR$ or $HN=Q$ in which R and Q are as above. The intermediate in its turn can be prepared by reacting o-toluidine and an α-halo-propionyl halide. Preferably the bromine containing compound is the halogen compound used but this is not essential.

The substituted toluidides in accordance with the invention can be prepared and administered in the form of their hydrochlorides. They can, however, be combined with other acids, both organic and inorganic, for example, sulphuric acid, phosphoric acid, acetic acid, phenylacetic acid, benzoic acid, lactic acid, succinic acid, citric acid, tartaric acid, fumaric acid, malonic acid and malic acid, to give physiologically acceptable salts.

The substituted toluidide compounds may be mixed with an inert pharmaceutically acceptable diluent or diluents to give compositions for medical, dental or veterinary administration. These compositions may also contain other pharmaceutically and pharmacologically compatible active ingredients which are chemically inert to the compounds in accordance with the invention if required. Normally the compounds will be injected in the form of an injectable solution.

It has been found that the pyrrolidine derivative of aminopropionyl-o-toluidide in which X in the above formula represents:

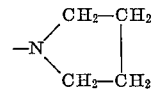

shows a greater anaesthetic effect than lignocaine and that the cyclo-pentylamine derivative in which X represents:

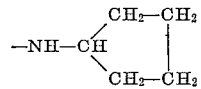

has an even greater effect than the pyrrolidine derivative. On the other hand the cyclo-propylamine derivative in which X represents:

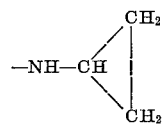

gave a shorter duration of anaesthesia than lignocaine and had only half the toxicity ($LD_{50}$ in mice). No irritation was observed for any of the compounds in accordance with the invention in concentrations up to 5% by Draize's method.

The following examples illustrate the preparation of compounds in accordance with the invention.

EXAMPLE 1

α-Pyrollidyl-propio-o-toluidide o-Toluidine (107 g., 1 mole) was dissolved in glacial acetic acid (800 ml.) and cooled to a temperature of 10° C. α-Bromo-propionyl-bromide (238 g., 1.1 moles) was added to the solution and the mixture was stirred for about 1 minute. Then a solution of sodium acetate (330 g. of $CH_3COONa \cdot 3H_2O$ made to a solution of 1½ litres) was added and the mixture was stirred for another 30 minutes. A precipitate was formed which was filtered off, washed with water and dried. The intermediate α-bromo-propio-o-toluidide was obtained with a yield of 77% by weight and it had a melting point of 131–132° C.

Next the α-bromo-propio-o-toluidide (1 mole) and pyrrolidine (2.2 moles) were dissolved in dry benzene and refluxed for 8 hours. After cooling the mixture was diluted with dry ether and the precipitated pyrrolidine hydrobromide was filtered off. The filtrate was extracted with 4 N HCl until the extract no longer showed opacity with ammonia. The aqueous extract was then alkalised with concentrated ammonia the free base formed was extracted with ether, and the etherial extract was dried over anhydrous sodium sulphate. After evaporating off the ether the residue was distilled at a temperature of about 137 to 141° C. under a high vacuum of 0.18 mm. of mercury to give the α-pyrrolidyl-propio-o-toluidide which was obtained with a yield of 88% by weight.

*Analysis.*—Required for $C_{14}H_{20}N_2O$ (percent): C, 72.38; H, 8.68; N, 12.06; O, 6.89. Found (percent): C, 72.39; H, 8.44; N, 12.12; O, 7.05.

EXAMPLE 2

α-(Cyclopentylamino)-propio-o-toluidide

Using cyclopentylamine instead of pyrrolidine the process set out in Example 1 was repeated with the α-bromo-propio-toluidide intermediate (1 mole) and cyclopentylamine (2.2 moles). α(Cyclopentylamino)-propio-o-toluidide which was distilled at a temperature of 162° C. under 0.3 mm. of mercury was obtained with a yield of 72.5% by weight.

*Analysis.*—Required for $C_{15}H_{22}N_2O$ (percent): C, 73.14; H, 9.00; N, 11.38; O, 6.49. Found (percent): C, 73.56; H, 9.21; N, 11.08; O, 6.15.

EXAMPLE 3

α-(Cyclopropylamino)-propio-o-toluidide

α-Bromo-propio-o-toluidide (1 mole) and cyclopropylamine (2.2 moles) were dissolved in benzene in a well corked round bottomed flask and heated at a temperature of 80° C. on a water bath for 8 hours. After cooling the flask was opened and the contents worked up as described in Example 1.

α-(Cyclopropylamine)-propio-o-toluidide was obtained with a yield of 77% by weight. It was a soft waxy solid with a characteristic odour and a melting point of 62° C.

*Analysis.*—Required for $C_{13}H_{18}N_2O$ (percent): C, 71.52; H, 8.31; N, 12.83; O, 7.33. Found (percent): C, 71.99; H, 8.34; N, 12.35; O, 7.32.

The hydrochlorides of the derivatives prepared in the preceding examples were prepared by conventional reactions and gave the following results.

| Hydrochloride of: | Yield, percent by weight | Melting point, °C. |
|---|---|---|
| α-Pyrrolidyl-propio-o-toluidide | 46.2 | [1] 234–6 |
| α-(Cyclopentylamino)-propio-o-toluidide | 98.5 | [1] 238–240 |
| α-(Cyclopropylamino)-propio-o-toluidide | 85.3 | [1] 189 |

[1] Decomp.

All three hydrochlorides were faintly coloured as prepared but were obtained as colourless by recrystallisation from aqueous acetone.

EXAMPLE 4

α-(1-pyrrolidinyl)-propio-o-toluidide o-Toluidine (107 g., 1 mole) was dissolved in glacial acetic acid (800 ml.) and cooled to a temperature of 10° C. α-Chloro-propionyl-chloride (139.7 g., 1.1 moles) was added to the solution and the mixture was stirred for about 1 minute. A solution of 330 g. of sodium acetate ($CH_3 \cdot COONa \cdot 3H_2O$) made to a solution of 1½ litres was added and the mixture was stirred for another 30 minutes. A precipitate was formed which was filtered off, washed with water and dried. The intermediate α-chloro-propio-o-toluidide was obtained with a yield of 72% by weight. It had a melting point of 110–111° C.

The α-chloro-propio-o-toluidide (1 mole) and a large excess of pyrrolidine (some 6 or 7 moles) were refluxed together for 5 hours at the boiling poins of pyrrolidine. Alternatively, to avoid excssive discoloration the mixture was sealed in a container from which the air had been displaced by nitrogen and then autoclaved at a temperature of 120° C. for 30 to 60 minutes. Thereafter, the excess pyrrolidine was recovered by distillation.

The α-(1-pyrrolidinyl)-propio-o-toluidide was separated by adding dry benzene and dry ether and proceeding as described in Example 1.

Alternatively, the hydrochloride salt of the product was prepared by adding 300 ml. concentrated hydrochloric acid in three 100 ml. portions during which heat was developed and solidification occured, and was then diluted with water to 5 litres. The liquid was extracted with several 200 ml. volumes of chloroform until no more colour was extracted and the remaining liquid was then made alkaline by the addition of 500 ml. of sodium hydroxide 33% w./v. solution. The precipitated anilide was extracted with chloroform, dried over anhydrous sodium sulphate, filtered, and the chloroform was distilled off. To the residue was added 150 ml. of concentrated hydrochloric acid and 950 ml. of acetone. Decolorising charcoal was also added and the mixture was boiled, filtered, and allowed to cool.

The inilide hydrochloride crystals were filtered off, and washed with a little acetone. A further crop of crystals were obtained by cooling the mother liquor to −15° C. The yield was 53% by weight. Recrystallisation was from aqueous acetone. The melting point of the product was 236–238° C.

The following Tables I, II, and III summarise the results of pharmacological tests carried out with examples of compounds in accordance with the invention and compares them with lignocaine.

TABLE I

| Compound (Y represents) | Intravenous toxicity (mg./kg. body weight) | Subcutaneous toxicity (mg./kg. body weight) | Irritation Draize's method | Irritation Threshold irritant concentration [1] | Relative duration of anaesthesia |
|---|---|---|---|---|---|
| Control: Lignocaine | 35 | 360 | 0 | 4% | 1.0 |
| 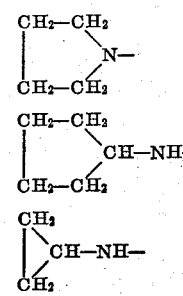 | 34 | 1,300 | 0 | 2% | 1.5 |
| 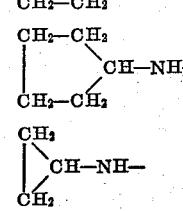 | [2] | | 0 | | 4.0 |
| 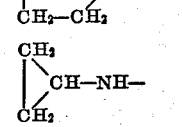 | 70 | 990 | 0 | 2% | 0.5 |

[1] Hoppe's Trypan Blue method.
[2] Below 10.

TABLE II

| Compound (Y represents) | Time in minutes for onset of anaesthesia by conduction[1] | |
|---|---|---|
| | 2% w./v. | 1% w./v. |
| Control: Lignocaine | 8.7 | 10.7 |
| $\begin{array}{c} CH_2-CH_2 \\ \phantom{CH_2-}\diagdown \\ \phantom{CH_2-CH_2}N- \\ \phantom{CH_2-}\diagup \\ CH_2-CH_2 \end{array}$ | 8.3 | 11.1 |
| $\begin{array}{c} CH_2 \\ \diagdown \\ \phantom{CH_2}CH-NH- \\ \diagup \\ CH_2 \end{array}$ | 7.0 | 15.0 |

[1] Frog Plexus Method.

TABLE III

| Compound (Y represents) | Relationship between percent concentration and time to reach 50% anaesthesia | |
|---|---|---|
| | Percent concentration (w./v.) | Time of 50% anaesthesia (minutes) |
| Control: Lignocaine | 1.0 | 25 |
| | 2.0 | 40 |
| | 3.0 | 63 |
| $\begin{array}{c} CH_2-CH_2 \\ \phantom{CH_2-}\diagdown \\ \phantom{CH_2-CH_2}N- \\ \phantom{CH_2-}\diagup \\ CH_2-CH_2 \end{array}$ | 0.25 | 27 |
| | 0.5 | 41 |
| | 1.0 | [1] 105 |
| $\begin{array}{c} CH_2 \\ \diagdown \\ \phantom{CH_2}CH-NH- \\ \diagup \\ CH_2 \end{array}$ | 1.0 | 14 |
| | 2.0 | 22 |
| | 6.0 | [1] 105 |

[1] Estimated.

It will be seen from these tables that the compounds in accordance with the invention are at least as effective an anaesthetic as lignocaine and in particular the pyrrolidine derivative is more effective than lignocaine. A detailed comparison of the properties of this pyrrolidine derivative (α-pyrrolidyl-propio-o-toluidide) with lignocaine is set out below in Table IV, in which the coefficient of safety is the ratio between the anaesthetic (pyrrolidyl derivative) and the reference anaesthetic (lignocaine) of the toxicity multiplied by the anaesthetic potency and varies with the route of injection and concentration used (see Goldberg L., Svensk. Tandl. Tidskr., 1947, 40, 797 and 819, and Goldberg L., Svensk. Lakartidn., 1948, 45, 107).

TABLE IV

| Measured parameter | Lignocaine | Alpha-pyrrolidyl-propio-o-toluidide |
|---|---|---|
| 1. Intravenous toxicity (mg./kg. body weight) | 35 | 34 |
| 2. Subcutaneous toxicity (mg./kg. body weight) | 360 | 1,300 |
| 3. Anaesthetic potency | 1 | 1.5 |
| 4. Ratio of the concentrations producing 50% anaesthesia in the same time | ([1]) | ([2]) |
| 5. Threshold irritant concentration, percent | 4 | 2 |
| 6. Coefficient of safety by— | | |
| (i) intravenous injection | | 1.5 |
| (ii) subcutaneous injection | | ([3]) |

[1] 2% in 40 minutes.
[2] 0.5% in 41 minutes.
[3] At least 5.4.

I claim:
1. α-pyrrolidyl-propio-o-toluidide.
2. A physilogically acceptable acid addition salt of α-pyrrolidyl-propio-o-toluidide.
3. The hydrochloric acid addition salt of α-pyrrolidyl-propio-o-toluidide.

References Cited

UNITED STATES PATENTS 2,792,399  5/1957  Thuresson et al. _____ 260—294
2,912,460  11/1959  Ehrhart et al. _____ 260—562

FOREIGN PATENTS 759,744  10/1956  Great Britain.

ALEX MAZEL, Primary Examiner
R. V. RUSH, Assistant Examiner

U.S. Cl. X.R.
260—557; 424—274, 324